United States Patent [19]

French

[11] Patent Number: 4,894,741

[45] Date of Patent: Jan. 16, 1990

[54] MAGNETO-RESISTIVE HEAD WITH IMPROVED SENSITIVITY

[75] Inventor: William W. French, Cardiff-by-the-Sea, Calif.

[73] Assignee: Eastman Kodak Company, Rochester, N.Y.

[21] Appl. No.: 191,087

[22] Filed: May 6, 1988

[51] Int. Cl.[4] .............................................. G11B 5/30
[52] U.S. Cl. .................................................. 360/113
[58] Field of Search ........................................ 360/113

[56] References Cited

U.S. PATENT DOCUMENTS 4,663,685  5/1987  Tsang ................................. 360/113

Primary Examiner—A. J. Heinz
Attorney, Agent, or Firm—Robert F. Cody

[57] ABSTRACT

To provide optimized performance in a magneto-resistive head having a soft adjacent magnetic biasing layer separated from a current-carrying magneto-resistive sense film by an extremely thin electrically insulating film, the invention provides that the soft adjacent magnetic biasing layer be comprised of a magnetically soft layer of high electrical resistivity, whereby the effect of pinholes in the electrically insulating film is significantly lessened.

4 Claims, 2 Drawing Sheets

MAGNETO-RESISTIVE HEAD WITH IMPROVED SENSITIVITY

BACKGROUND OF THE INVENTION

Field of the Invention

This invention relates in general to magnetic flux sensing apparatus and, in particular, to a magnetic head of the type employing a thin magnetic film structure as a magneto-resistive element response to the flux being sensed.

The invention as well as the prior art will be described with reference to the figures wherein FIG. 1 is a perspective diagram of a prior art magneto-resistive head over which the invention provides improvement, FIG. 2 is a perspective diagram of apparatus illustrating a presently preferred embodiment of the invention, and FIG. 3 is a diagram illustrating a presently preferred way to provide a magnetic film having properties pursuant to the teaching of the invention.

BACKGROUND RELATIVE TO THE PRIOR ART

Playback of recorded signals from a magnetic recording medium by means of a conventional magnetic head is sensitive to flux rate-of-change is difficult for low recorded signal frequencies, and theoretically impossible for recorded DC signals, or when there is no relative motion between the recording medium and the magnetic head. Accordingly, various techniques have been proposed for sensing magnetic flux, as opposed to the rate-of-change of such flux, e.g. Hall effect, flux gate, and magneto-resistive devices, thereby to permit recording media to be used as optimally as possible.

With regard to the matter of magneto-resistive devices for sensing magnetic fields, the use of a thin magnetic film for field sensing purposes is known. Representative prior art depicting the use of magneto-resistive thin-film structures can be found in the following references: U.S. Pat. Nos. 3,731,007; 3,947,889; 3,921,218; 3,945,038; 4,051,542; 4,413,296; and 4,631,613 and 4,705,613. Typically, a thin (planar) magneto-resistive film is employed to sense a (recorded) magnetic field to which it is exposed by passing an electrical sense current (either AC or DC) through the film, the film magnetization vector being canted with respect to the direction of current flow. The (recorded) field being sensed exerts a torque on the magnetic moment of the film, causing the resistance of the film to increase or decrease depending on the sense and magnitude of the field. The resistance of the film is, therefore, the analog of the field strength.

To effect a quiescent "canting" of the thin film magnetization vector, it has been proposed to complement the magneto-resistive sense film with what may be called a "soft adjacent layer". The way in which a soft adjacent layer provides bias so as to cant quiescently the magnetization vector of a magneto-resistive sense film may be appreciated by referring to FIG. 1;

A thin film 10 of Permalloy, constituting a magneto-resistive sense film and supported on a substrate (not shown), has a magnetization vector that is, typically, oriented in the direction of the length of such films. The Permalloy film 10 supports a thin electrically insulating film 12 of silicon dioxide which in turn supports a second film 14 of Permalloy. Sense current 1 is passed the length of the film 10 and, as such current i courses the film 10, it sets up a magnetic field $M_{Bias}$ which magnetizes the film 14 in a direction perpendicular to the direction of the current 1. With the film 14 so magnetized, a bias is applied to the normally longitudinally oriented magnetization vector of the magneto-resistive sense film 10; and, as a result, such magnetization vector becomes canted with respect to the direction of current flow coursing the length of the film 10. Thus, as magnetic fields associated with a recorded track 16 exert moments upon the canted magnetization vector of the magneto-resistive sense film 10, such canting increases and decreases accordingly; corollarily, the resistance of the film 10 varies as an analog function with respect to the recorded signal field since the degree of canting corresponds to the resistance of the film 10.

PROBLEM(S)

To bring about efficient biasing of the magnetization vector of the film 10, it is highly desirable that the silicon dioxide film between the films 10, 14 be as thin as possible, typically on the order of 50 Angstroms or less. A problem arises, however, when using a silicon dioxide film of such thinness, viz. pinholes can occur in the film 12 which undesirably short circuit the sense current i into the soft adjacent layer film 14, thereby decreasing the sensitivity of the magneto-resistive head to recorded signal fields. That is, not only is sense current bled into the soft adjacent layer film via the pinholes, but, because of such current bleeding, the canting of the magnetization vector of the film is undesirably affected as well.

SUMMARY OF THE INVENTION (PROBLEM SOLUTION)

To provide optimized performance in a magneto-resistive head having a soft adjacent magnetic biasing layer separated from a current-carrying magneto-resistive sense film by an extremely thin electrically insulating film, the invention provides that the soft adjacent magnetic biasing layer be comprised of a magnetically soft layer of high electrical resistivity, whereby the effect of pinholes in the electrically insulating film is significantly lessened, i.e. the effect of a short circuit via the soft adjacent layer becomes relatively inconsequential. In a preferred embodiment of the invention, the soft adjacent magnetic biasing film is comprised of amorphous Alfesil having a resistivity of between 500 to $1000 \times 10^{-6}$ $\Omega$cm, as compared to a resistivity of around $20 \times 10^{-6}$ $\Omega$cm for Permalloy. Thus, electrical shorting between the Permalloy and the Alfesil films results in minimal current flow from the Permalloy film into the Alfesil film.

DETAILED DESCRIPTION

Figure 1:
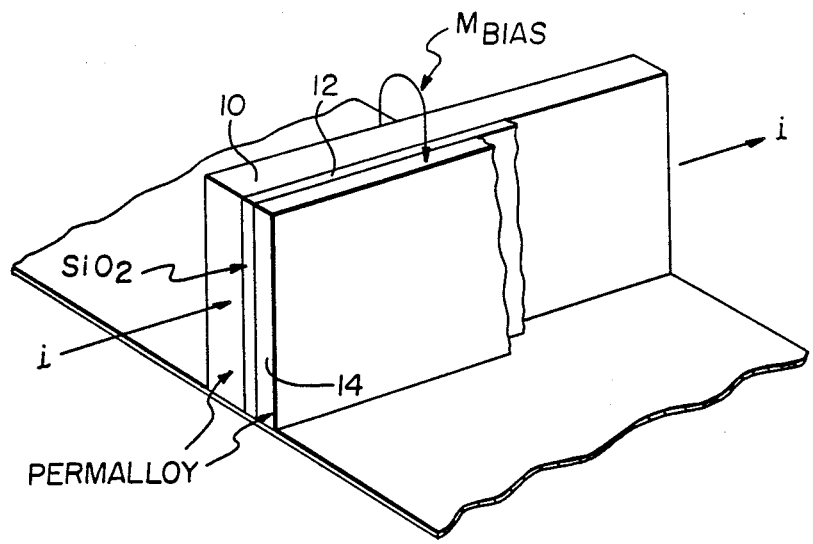
Figure 2:
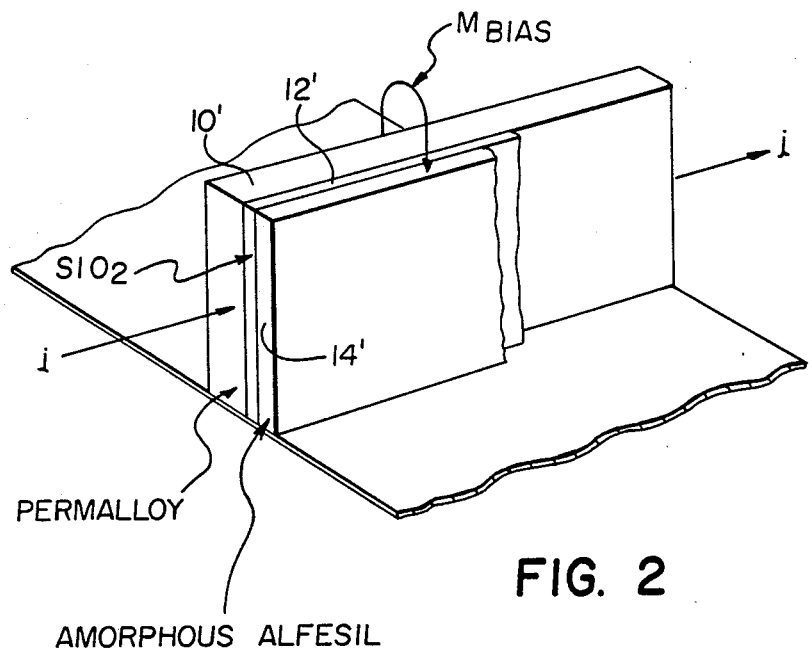
Figure 3:
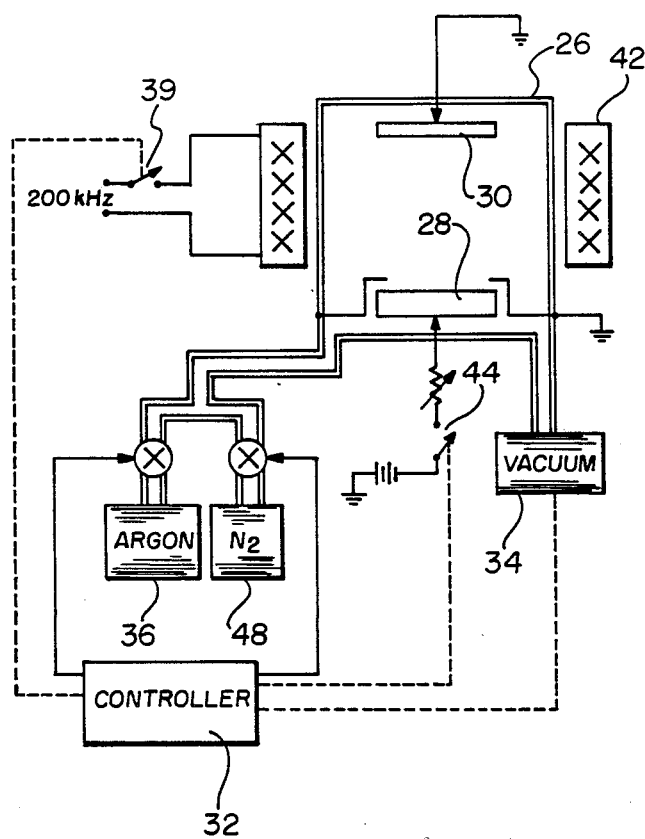

Referring to FIG. 2, a magneto-resistive head similar to the head of FIG. 1 has a sense-current-carrying Permalloy layer 10' separated from a soft adjacent magnetic biasing film 14' by an electrically insulating film 12' of silicon dioxide. The film 12' is extremely thin (typically less than 50 Angstroms) to provide efficient magnetic coupling between the magnetic films 10', 14'. The soft adjacent magnetic biasing film 14' is comprised, preferably, of amorphous Alfesil which may be produced by the procedure taught generally in U.S. Pat. Nos. 4,631,613 and 4,705,613; and outlined, more particularly, as follows:

To produce a thin soft adjacent magnetic biasing film having the desired magnetic and electrical characteristics, a sputtering operation as depicted in FIG. 3 is employed. With reference to FIG. 3, a sputtering chamber 26 is adapted to contain Alfesil target material 28 and a substrate 30 (i.e. a supported Permalloy film that is coated with an $SiO_2$ film), upon which a sputtered thin film according to the invention is deposited. Under control of a controller 32 (which may be a microprocessor, or a set of motor driven actuators, or simply a human operator, etc.), a vacuum 34 is turned on to clear ($2 \times 10^{-6}$ torr) the sputtering chamber 26. Thereafter, under control of the controller 32, argon gas (36) is introduced to the sputtering chamber 26; after which an argon plasma is produced (switch 39) by a coil 42 surrounding the sputtering chamber 26. The coil 42, is excitable by a 200 kHz radio frequency signal.

The Alfesil target is disposed for negative biasing (switch 44) at 1,000 volts; and the substrate is grounded.

Given that the Alfesil target 28 and substrate 30 are in place, and that the argon plasma has been formed within the sputtering chamber 26, a film of Alfesil gets deposited on the $SiO_2$ film of the substrate 30. During the time the Alfesil film is being formed, nitrogen (is introduced to the sputtering chamber 26, thereby to convert what would otherwise be a low permeability crystalline film to a high permeability amorphous one (saturation magnetization: 10,000 gauss). Thereafter, the plasma is terminated; the bias is removed; and the sputtering chamber 26 vented, thereby to ready the chamber 26 for another sputtering operation.

The invention has been described in detail with particular reference to a presently preferred embodiment, but it will be understood that variations and modifications can be effected within the spirit and scope of the invention.

What is claimed is:

1. In a magneto-resistive head of the type having
   a. a field-responsive sense film of magnetic material adapted to carry a sense current,
   b. a relatively electrically non-conductive film layered with said sense film of magnetic material,
   c. a magnetic biasing layer of magnetic material covering said relatively electrically non-conductive film, the improvement wherein said magnetic biasing layer has a resistivity substantially greater than the resistivity of said sense film, and
   d. said relatively electrically non-conductive film is less than 50 Angstroms in thickness.

2. The magneto-resistive head of claim 1 wherein said sense film is comprised of Permalloy, and wherein said magnetic biasing layer is comprised of amorphous Alfesil.

3. The magneto-resistive head of claim 1 wherein
   a. said relatively electrically non-conductive film is less than 50 Angstroms in thickness,
   b. said sense film is comprised of Permalloy, and
   c. said magnetic biasing film is comprised of amorphous Alfesil.

4. The magneto-resistive head of claim 3 wherein the resistivity of said Permalloy is about $20 \times 10^{-6}$ $\Omega$cm, and the resistivity of said amorphous Alfesil is greater than $500 \times 10^{-6}$ $\Omega$cm.

* * * * *